United States Patent [19]
Patel

[11] Patent Number: 5,276,849
[45] Date of Patent: Jan. 4, 1994

[54] APPARATUS AND METHOD FOR MAINTAINING CACHE/MAIN MEMORY CONSISTENCY UTILIZING A DUAL PORT FIFO BUFFER

[75] Inventor: Bhikhoo J. Patel, Lowell, Mass.

[73] Assignee: Wang Laboratories, Inc., Lowell, Mass.

[21] Appl. No.: 912,055

[22] Filed: Jul. 7, 1992

Related U.S. Application Data

[63] Continuation of Ser. No. 405,800, Sep. 11, 1989, abandoned.

[51] Int. Cl.$^5$ .................. G06F 13/00; G06F 5/06
[52] U.S. Cl. ............................. 395/425; 395/250; 364/244.8; 364/964.31; 364/964.341; 364/DIG. 1; 364/DIG. 2; 365/230.05
[58] Field of Search .... 395/425, 250, 200MS, 900MS; 365/230.05; 364/DIG. 1, DIG. 2

[56] References Cited

U.S. PATENT DOCUMENTS

| | | | |
|---|---|---|---|
| 3,883,854 | 5/1975 | Heinberg et al. | 395/425 |
| 3,984,818 | 9/1976 | Gnadeberg et al. | 395/425 |
| 4,157,586 | 6/1979 | Gannon et al. | 395/425 |
| 4,195,340 | 3/1980 | Joyce | 395/425 |
| 4,494,190 | 1/1985 | Peters | 395/575 |
| 4,561,051 | 12/1985 | Rodman et al. | 395/425 |
| 4,685,082 | 8/1987 | Cheung et al. | 395/425 |
| 4,716,545 | 12/1987 | Whipple et al. | 395/325 |
| 4,742,446 | 5/1988 | Morioka et al. | 395/250 |
| 4,768,148 | 8/1988 | Keeley et al. | 395/425 |
| 4,805,098 | 2/1989 | Mills, Jr. et al. | 395/250 |
| 4,933,835 | 6/1990 | Sachs et al. | 395/425 |
| 4,992,930 | 2/1991 | Gilfeather et al. | 395/425 |

FOREIGN PATENT DOCUMENTS 0149392 7/1985 European Pat. Off. .
0168121 1/1986 European Pat. Off. .

*Primary Examiner*—Glenn Gossage
*Attorney, Agent, or Firm*—Kenneth L. Milik

[57] ABSTRACT

An apparatus and method for maintaining cache/main memory consistency in a data processing system including a write-through cache (14). For write operations of less than a word in length, the write data stored within a FIFO memory device 18 associated with a first bus agent reflects the result of a read/modify/write type of access wherein a byte or half word has been merged by a local processor 12 with a cache word. Memory control lines driven to a system bus 20 indicate to a memory controller 22 that a write operation is to be accomplished as a word write, thereby eliminating the additional time required to achieve a read/modify/write memory controller cycle. To prevent the occurrence of a problem wherein another bus agent, such as another CPU or an I/O device, writes to a system memory 24 during an interval of time that the word of data is temporarily buffered within the FIFO there is provided circuitry for detecting an external write made to the system memory. Circuitry is provided for changing the memory command lines to indicate, instead of a word write, a byte write or a half-word write operation. This causes the memory controller to operate only upon the portion of data word that was modified by the local processor and to perform a conventional read/modify/write type of cycle to merge the byte or half word with a word from main memory.

12 Claims, 2 Drawing Sheets

APPARATUS AND METHOD FOR MAINTAINING CACHE/MAIN MEMORY CONSISTENCY UTILIZING A DUAL PORT FIFO BUFFER

This is a continuation of copending application Ser. No. 07/405,800 filed on Sep. 11, 1989, now abandoned.

FIELD OF THE INVENTION

This invention relates generally to data processing apparatus and method and, in particular, to a Central Processor Unit (CPU) having a write-through cache and a local buffer memory paralleling the cache for buffering write data. The CPU includes circuitry for detecting an occurrence of an externally generated write to a main memory and circuitry for modifying an associated memory command from a word-type of write access to less than a word type of write access to prevent data in the main memory from being overwritten with possibly non-current data from the buffer memory.

BACKGROUND OF THE INVENTION

The invention described herein is particularly useful in a data processing system of the type wherein a memory controller controls a plurality of memory devices organized for storing multi-byte memory words. In such a memory error detection and correction syndrome bits are generated typically over a number of bytes of the memory word such as, for example, four bytes of a 32-bit memory word.

When a central processor unit (CPU) writes a word of data to such a memory the error syndrome bits are generated for the entire word and stored within associated memory devices. However, when the CPU writes less than a full word of data, such as a byte (eight bits) or a half word (16 bits) of data, the memory controller operates to first read the full word of data, merge the byte or bytes, generate the error syndrome bits over the full merged word and write the merged word with the associated syndrome bits back to memory. As can be appreciated, this read/modify/write type of access may be a time consuming process.

In some systems a plurality of CPUs are coupled to a common system bus and, through the system bus, to one or more memory units. Each CPU may have a local cache memory wherein a copy of a portion of a main system memory is maintained. In such a system it is a desirable goal that the main memory be updated to accurately reflect changes made to data within the cache memories. For example, such a system may employ a write-through type of cache memory wherein data written to the cache is also written "through" the cache to the main memory. For this purpose a first-in/first-out (FIFO) memory can be employed in parallel with the cache, the FIFO accepting write data from the CPU and temporarily buffering the data before providing the data over a system bus to the main memory. The FIFO is normally a word width or greater.

For those write operations of less than a word in width the data stored within the FIFO reflects the result of a read/modify/write type of access wherein a byte or half word is already merged by the CPU with a cache word. Thus, instead of writing a byte or half word to the memory and incurring the read/modify/write cycle time delay in generating the error syndrome bits, a more efficient cache memory write-through technique writes a full, already merged word from the FIFO to the memory.

However, a problem is created when another system bus agent, such as another CPU in a multi-processor system, writes to the main memory during the interval of time that the word of data is temporarily buffered within the FIFO. In this case the word in main memory that is the target of the FIFO may have just been updated by the other bus agent. Permitting the full word to be written from the FIFO would result in the newer data being over-written by the older data contained within the FIFO and the destruction in the main memory of the newer data.

It is thus one object of the invention to provide a method and apparatus for updating data within a main memory as a result of a write operation to a local cache memory.

It is another object of the invention to provide a method and apparatus for use with a write-through cache that updates data within a main memory by providing a dual port memory, such as a FIFO buffer, in parallel with the cache memory and to further provide circuitry for detecting when a write occurs to the main memory to invalidate a full word write of data from the FIFO buffer to the main memory.

It is a further object of the invention to provide a method and apparatus for use with a write-through cache that updates data within a main memory by providing a FIFO buffer in parallel with the cache memory and to further provide circuitry for detecting when a write occurs to the main memory and circuitry to modify an associated memory command from a word write access to less than a word type of write access to prevent data in the main memory from being overwritten with possibly non-current data.

SUMMARY OF THE INVENTION

The foregoing problems are overcome and the objects of the invention are realized by a method and apparatus for storing data units within a system memory over a system bus. Specifically a write-through cache is taught wherein for write operations of less than a word in length the write data stored within a FIFO memory device associated with a first bus agent reflects the result of a read/modify/write type of access wherein a byte or half word is merged by a local processor with a cache word. Memory control lines driven to the system bus indicate to a memory controller that a write operation is to be accomplished as a word write, thereby eliminating the additional time required to achieve a read/modify/write memory controller cycle. To prevent the occurrence of a problem wherein another bus agent, such as another CPU or an I/O device, writes to the system memory during an interval of time that the word of data is temporarily buffered within the FIFO and the newly written data is overwritten by the FIFO, there is provided circuitry for detecting an external write made by another system bus agent to the system memory. Circuitry is also provided for detecting that the FIFO has data stored within and circuitry is provided for changing the memory command lines to indicate, instead of a word write, less than a word write. This causes the memory controller to operate only upon the portion of data word that was modified by the local processor and to perform a conventional read/modify/write type of cycle to merge only that portion of the word with a word from main memory. For example, a byte or a half-word is identified to the memory controller by the least significant bits of an address that is also buffered by the FIFO.

BRIEF DESCRIPTION OF THE DRAWINGS

The above set forth and other features of the invention are made more apparent in the ensuing Detailed Description of the Invention when read in conjunction with the attached Drawing, wherein.

DETAILED DESCRIPTION OF THE INVENTION

Figure 1:
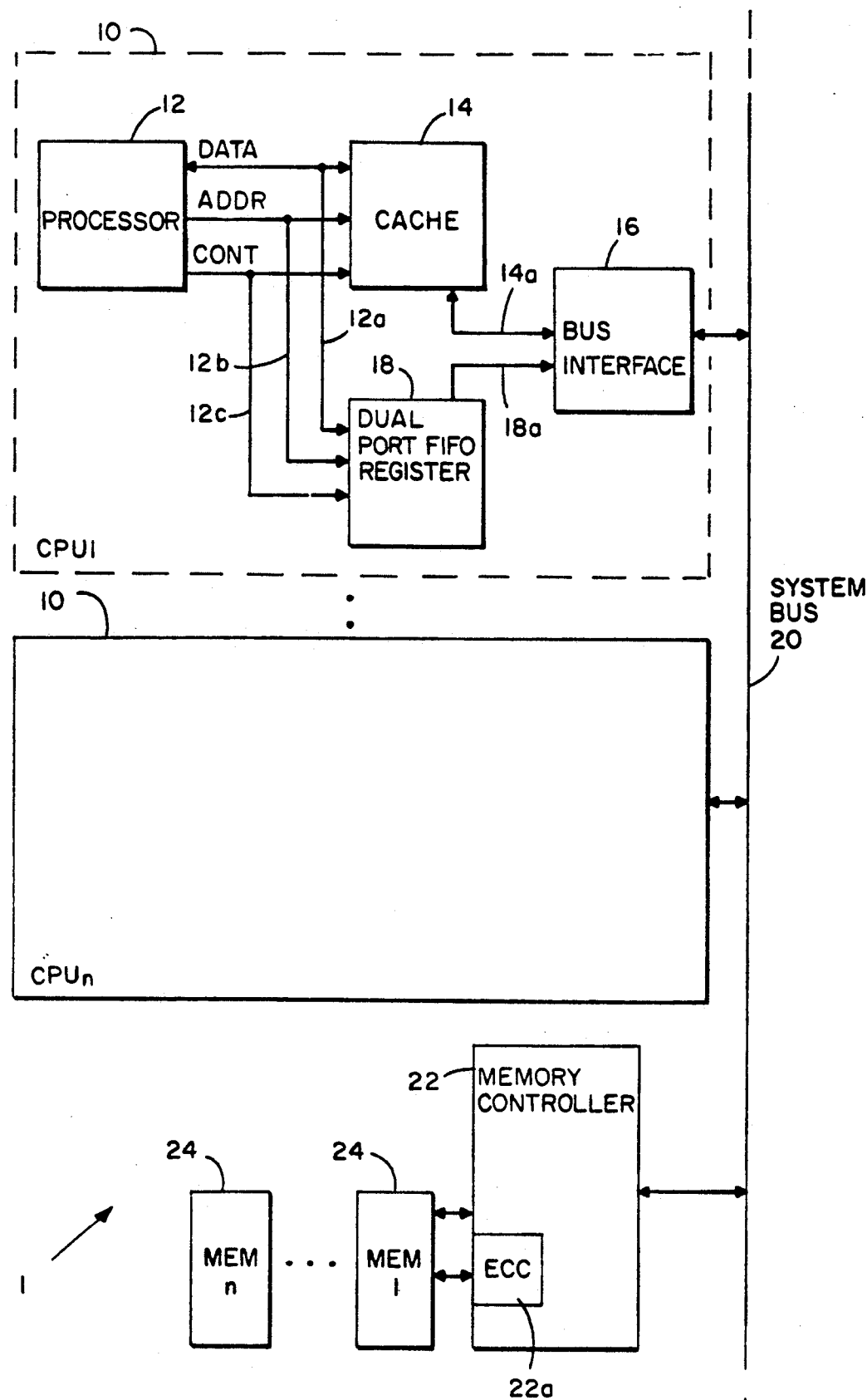
FIG. 1 is a block diagram of a data processing system constructed and operated in accordance with the invention.

FIG. 1 is a block diagram of a portion of an illustrative data processing system 1 constructed and operated in accordance with the invention. System 1 includes at least one central processor unit (CPU) 10 shown as CPU1 through CPUn. Typically each CPU 10 is of identical construction to others of the CPUs. CPU 10 includes a processor 12, such as a microprocessor device, that is coupled to a local cache memory 14 via a plurality of data lines 12a, address lines 12b and control lines 12c. The cache memory 14 is coupled via a bus 14a to a bus interface unit 16, the bus interface unit 16 providing bidirectional data communication with a system bus (SB) 20. Also associated with the cache 14, but not shown, are a plurality of parity lines and various other signals of a type known to those having skill in the art. The bus 14a includes the data, address and control lines 12a-12c. Coupled in parallel with the cache 14 is a dual port memory device such as a FIFO buffer 18. FIFO 18 functions to briefly buffer write data intended for updating a main memory 24 that is coupled to the system bus 20 through a memory controller 22. The FIFO 14 operates to receive and store write data from the processor 12 before the data is provided to SB 20. In that the processor 12 typically operates at a faster clock rate than the SB 20, the FIFO 18 permits the processor 12 to write the data, and continue operation without having to synchronize its operation with the typically slower SB 20. The FIFO 18 is provided with sufficient memory capacity to store at least one and typically up to four words or double words of data, although more or less than this typical number may be readily provided.

A plurality of memory units (MEM1-MEMn) may be provided, depending on the memory density of an individual one of the units 24 and the desired total memory capacity of the system 1. The memory controller 22 includes Error Correction Circuitry (ECC) 22a. ECC 22a operates to generate and test syndrome bits upon a word of memory data at a time. In this illustrative embodiment, a word of memory data is considered to be four bytes, or 32 bits, in width. The memory controller 22, memory units 24, SB 20, FIFO 18 and cache 14, for example, may be operable for simultaneously conveying, reading and/or writing multiple words of data, such as a double word (64 bits) a quad word (128 bits).

For write operations of less than a word in length the data stored within the FIFO 18 reflects the result of cache write hit, wherein a read/modify/write type of access is performed by processor 12 to merge a byte or half word with a cache word. Also, certain of the CONT 12c lines indicate to the memory controller 22 that the write is to be accomplished as a word write, thereby eliminating the additional time required to achieve the read/modify/write memory controller cycle. However, the aforementioned problem occurs when, for example, the CPUn writes to the memory 24 during an interval of time that the word of data is temporarily buffered within the FIFO 18. In this case the word in main memory that is the target of the FIFO 18 write may have just been changed by CPUn. If the FIFO 18 write were allowed to proceed as a word write the newer data would be over-written by the older data from the cache 14. As will now be described, this problem is circumvented by detecting within the CPU1 the write made to memory 24 by CPUn, or any other bus agent, and changing the CONT 12c memory command lines to indicate, instead of a word write, a byte write or a half word write operation. This causes the memory controller 22 to operate only upon the byte or half word of data that is being written and to perform a conventional read/modify/write type of cycle to merge the byte or half word with a word from main memory. The byte or half word is identified by the least significant bits of the address that is also buffered by the FIFO 18. In accordance with the invention, each of the CPUs 10 is provided circuitry to detect the occurrence of such an external write to memory 24 and circuitry to prevent the FIFO 18 from writing a full word of data to the memory 24 after such an external write occurs.

Figure 2:
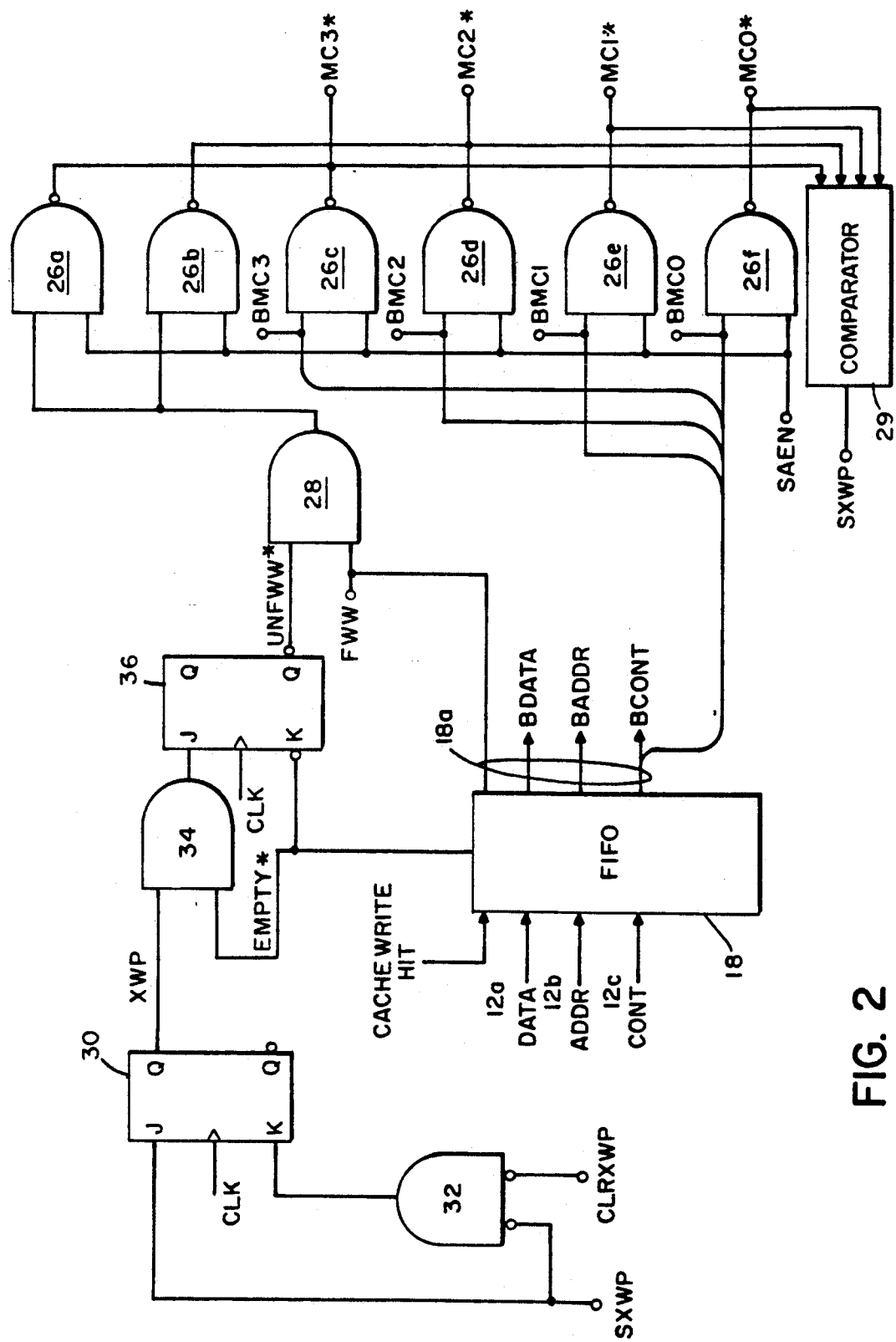
FIG. 2 is a simplified schematic diagram illustrating circuitry for implementing the invention.

Referring to FIG. 2 there is shown in greater detail the FIFO 18. Although illustrated as a single device it should be realized that the FIFO 18 is typically comprised of a plurality of individual FIFO devices for buffering the 32 data lines 12a, an associated 32 bit address line 12b, and associated control lines 12c. By example, the control lines identify the type of memory access associated with the data and address. That is, the control lines indicate whether the processor 12 performed a byte write, a half-word write or a word write, upon the associated word of data stored within the FIFO 18. The bus 18a includes buffered data (BDATA), buffered address (BADDR) and buffered control lines (BCONT) from the output of the FIFO 18. A plurality of system bus drivers or buffers are associated with the output 18a of the FIFO 18. In FIG. 2 only those drivers or buffers 26 associated with a portion of the BCONT lines are shown. Buffers 26c-26f provide a four bit memory control signal (MC0*-MC3*) to the system bus (SB) 20, the asterisk owing the signal name indicating in a conventional manner that the signal is asserted when a logic zero or low. The MCn* control bits are coded to identify to the memory controller 22 the type of memory access in the following manner.

| MC0* | MC1* | MC2* | MC3* | |
|---|---|---|---|---|
| 0 | 0 | 0 | 0 | WORD WRITE |
| 0 | 0 | 1 | 0 | HALF WORD WRITE |
| 0 | 0 | 1 | 1 | BYTE WRITE |

NAND buffers 26c through 26f are enabled to drive their associated memory control bits onto the SB 20 when a controlling system access enable (SAEN) signal is asserted by circuitry (not shown) on the CPU 10. The assertion of SAEN enables the driving of data from the CPU 10 to the SB 20.

Associated with buffers 26c and 26d are two additional NAND buffer 26a and 26b having their outputs wire-ANDed to the output of buffers 26c and 26d, respectively. Preferably the buffers 26 are open collector type devices wherein such wire-ANDed connections are readily accomplished.

The purpose of buffers 26a and 26b is to normally override the byte write or half-word write control signal indications, MC2* and MC3* high or MC2* high and MC3* low, respectively, in order to make the control signal indication a word write indication with MC2* and MC3* both low. Buffers 26a and 26b each have as an input signal an output of a gate 28 which has as an input signal a "force word write" (FWW) signal. FWW is one of the buffered control lines that is output from the FIFO 18, FWW being asserted high as a result of a CACHE WRITE HIT signal that is asserted when a processor 12 write hits the cache. The state of the CACHE WRITE HIT signal is stored within the FIFO 18 along with the associated word of data that is written to the cache 14 and to the FIFO 18 by the processor 12. The FWW signal when asserted forces, in conjunction with a normally deasserted UNFWW* signal (to be described), a word write command to the memory controller 22. This causes memory controller 22 to write a word of data, thereby eliminating the normally required read/modify/write type of access that is employed when writing a byte or a half word of data to the memory 24.

However, for those situations where an external write of the memory occurs, while the data is temporarily buffered in the FIFO 18, the forced word write is undesirable in that the FIFO 18 data may overwrite newly written data within the memory 24. To prevent the occurrence of such a situation the CPU 10 further includes additional circuitry to detect such an external write and to convert the word write type of access back to a byte write or a half-word write type of access.

Further in accordance with the invention CPU 10 includes circuitry, such as a comparator 29, for detecting when another agent coupled to the SB 20 performs a write to the memory 24. This other bus agent could be, by example, another CPU in a multi-CPU system, or could be I/O interface circuitry operable for writing data to the memory 24 from an I/O device, such as a disk or communication port. The occurrence of the write access by another bus agent also results in an interrogation of the cache 14 and, if necessary, an invalidation of cache 14. Circuitry (not shown) to perform these functions is well known in the art. The occurrence of such a write access over SB 20 furthermore is detected by comparator 29 and generates a "system external write pending" (SXWP) signal. This signal is input to a JK flip/flop (F/F) 30 where the assertion of this signal causes F/F 30 to set on the edge of a next clock (CLK) input. The Q output of F/F 30 is a signal designated "external write pending" (XWP) that, when asserted, indicates that an externally generated write has occurred on the SB 20. Subsequent to the generation of the SXWP signal a "clear external write pending" (CLRXWP) signal is generated by the CPU 10 to reset the F/F 30 on another edge of CLK. CLRXWP is generated to indicate that the cache 14 interrogation and, if required, the cache 14 invalidation has occurred in response to the externally generated write access of memory 24.

The XWP signal output from F/F 30 is provided to AND gate 34 in conjunction with an EMPTY* flag from the FIFO 18. When the FIFO 18 is empty, that is when the FIFO 18 contains no buffered writes, the EMPTY* signal is low forcing a low from AND gate 34. When FIFO 18 contains one or more buffered writes the EMPTY* signal is deasserted or high. EMPTY* being high in conjunction with XWP being high, XWP indicating an occurrence of an external system bus -write to memory 24, causes AND gate 34 to have a high output. The high output from AND gate 34 is applied to the J input of a JK F/F 36 and, in conjunction with an edge of CLK, causes the Q* output to go low. The Q* output of F/F 36 is a signal designated "undo force word write" (UNFWW*). The UNFWW* signal is asserted low only when an external system bus write is detected and is pending cache interrogation (XWP is high) and the FIFO 18 contains at least one buffered write (EMPTY* is high). UNFWW* being asserted, that is being low, causes the output of AND gate 28 to be low, further causing the outputs of NAND gates 26a and 26b to be high. This in turn overrides the forced word write due to the assertion of FWW and causes the states of buffered memory control signals (BMC2 and BMC3) to be reflected in the outputs of the memory control line drivers 26d and 26c, respectively. In other words, if the processor 12 had accomplished a byte write or a half-word write in generating the word of data within the FIFO 18 the MC0*-MC3* lines indicate same to the memory controller 22. The occurrence of the byte write or half-word write memory control signal is interpreted by the memory controller 22, in conjunction with the address bus, as a read/modify/write cycle to the addressed word of memory 24. The byte or half-word identified by the least significant bits of the address bus is merged with the data word that is read from the main memory, the ECC syndrome bits are generated, and the word is written back to the memory. In this manner any other data within the word that may have been recently changed by another bus agent is not overwritten by the full word of data within the FIFO 18.

If UNFWW* is not asserted, then the output of AND gate 28 is high so long as FWW is asserted. This high, in conjunction with SAEN being asserted, causes the outputs of open collector buffers 26a and 26b to both be low. The wire-ANDed node coupled to each of these outputs is thus forced to a logic low and results in the memory control signal appearing as a word write (MC0*-MC3* all low) to memory controller 22.

If the processor 12 had performed a word write that resulted in the cache write hit), an assertion of UNFWW* does not change the state of the MC2* and MC3* lines in that BMC2 and BMC3 were both made high by the action of processor 12.

In a presently preferred embodiment of the invention the SXWP signal is generated for any write access that is detected on SB 20. It can be appreciated, however, that additional logic can be employed to decode the system address bus in conjunction with the occurrence of the write to generate the SXWP signal only on the occurrence of a write to, for example, a same page of memory 24 as that contained within the cache 14. Likewise, with further decoding of the SB 20 address bus, the SXWP signal can be generated only when the detected system bus write occurs to an address that is the same as an address that is presently within the FIFO 18. The degree of granularity of the decoding process is a function of the particular application and the amount of logic that can be expended for this function.

The invention has been described in the context of a data processing system having a unit of data expressed as a 32 bit word, a 32 bit address bus and burner features as described above. It should be realized however that the teaching of the invention is applicable to a wide variety of data processing systems having characteristics that vary from those disclosed above.

Thus, while the invention has been particularly shown and described with respect to a presently preferred embodiment thereof, it will be understood by those skilled in the art that changes in form and details may be made therein without departing from the scope and spirit of the invention.

What is claimed is:

1. Apparatus coupled to a first agent that is coupled to a system bus, the apparatus temporarily storing data received from the first agent before the data is written to a system memory means that is also coupled to the system bus, comprising:

buffer storage means, said buffer storage means including,
   a first storage means for storing a unit of data having a predetermined number of bits, the first storage means having an output coupled to the system bus;
   a second storage means for storing a system memory means command for indicating a system memory means write operation for a unit of data stored within the first storage means, the system memory means command selectively specifying a full word memory means write operation or a partial word memory means write operation, the second storage means having an output;
   a third storage means for storing a system memory means address at which a stored unit of data is to be written in accordance with a system memory means command that is stored within the second storage means, the third storage means having an output coupled to the system bus;
   the apparatus further including,
   buffer means having an input coupled to said output of said second storage means and an output coupled to the system bus;
   detecting means, having an input coupled to the system bus and an output, for detecting from the system bus an occurrence of a write access by a second agent to the system memory means; and
   logic means, having an input coupled to the output of the detecting means and an output coupled to said buffer means, the logic means being responsive to the detecting means detecting an occurrence of a write access by the second agent to the system memory means and further being responsive to the first storage means having a unit of data stored therein, during an occurrence of the write access by the second agent, for causing the output of said buffer means to change from a first condition, wherein a full word write system memory means command is transmitted over the system bus to the system memory means without regard for the system memory means command that is stored within the second storage means, to a second condition wherein the system memory means command that is stored in the second storage means is transmitted through said buffer means to the system bus and to the system memory means.

2. Apparatus as set forth in claim 1 wherein said buffer storage means is comprised of a first in/first out (FIFO) buffer means.

3. Apparatus as set forth in claim 1 wherein the unit of data is a word having four bytes of data.

4. Apparatus as set forth in claim 1 wherein the first agent includes a cache memory means coupled between a source of data and the system bus, and wherein both the first storage means and the cache memory means simultaneously store data output from the source of data.

5. A method of providing data from a first agent to a system bus for storage within a system memory means, comprising the steps of:

receiving, from a data processing means coupled to the first agent, at least one unit of data;
   storing the at least one unit of data in a storage means; and
   providing a stored unit of data to the system bus for storage within the system memory means, wherein the step of providing includes the steps of,
   determining if the storage means has at least one unit of data stored therein;
   detecting from the system bus an occurrence of a write access by a second agent to the system memory means; and
   if the occurrence of a write access is not detected,
   providing the stored unit of data to the system memory means over the system bus while indicating to the system memory means over the system bus that the entire unit of data is to be written to the system memory means,
   and, if the occurrence of a write access is detected,
   providing the stored unit of data to the system memory means over the system bus while indicating to the system memory means over the system bus that only a portion of the unit of data is to be written to the system memory means, wherein the step of receiving includes the steps of
   reading a unit of data from a cache memory means coupled to the first agent, the unit of data read from the cache memory means being comprised of a plurality of bytes of data;
   merging at least one byte of data with the unit of data read from the cache memory means; and
   storing the unit of data having the at least one merged byte into the cache memory means at a predetermined address, the step of storing the unit of data into the cache memory means also including the steps of,
   storing the unit of data having the at least one merged byte into the storage means,
   storing an address associated with the unit of data having the at least one merged byte into the storage means, and
   storing a memory command into the storage means, the memory command indicating that the unit of data stored within the storage means has at least one byte merged therein.

6. A method as set forth in claim 5 wherein the step of storing the unit of data having the at least one merged byte into the storage means is accomplished by storing the at least one unit of data having the at least one merged byte within a first in/first out (FIFO) memory means.

7. A method as set forth in claim 5 wherein the second step of providing the stored unit of data to the system memory means includes the step of reading out the stored memory command from the storage means, and providing the stored memory command to the system memory means over the system bus.

8. A method as set forth in claim 5 wherein the first step of providing the stored unit of data to the system memory means includes the step of reading out the stored memory command from the storage means; and modifying the stored memory command to indicate that the entire unit of data stored in the storage means is to be written within the system memory means.

9. A method as set forth in claim 5 wherein the step of indicating that the entire unit of data is to be written to system memory means is accomplished by providing a word write memory command over the system bus; and wherein the step of indicating that a portion of a unit of data is to be written to system memory means is accomplished by providing either a byte write memory command or a half-word write memory command over the system bus.

10. Write-through cache apparatus associated with a first system bus agent, comprising:

read/write cache memory means coupled through a system bus to a main system memory for storing data also residing in the main system memory, the data having a width of at least a data word, wherein a data word is comprised of a plurality of bytes, said cache memory means being coupled to a data processor means for receiving data therefrom and for providing data thereto;

dual port memory means for storing at least one data word, said dual port memory means having a first port coupled to said cache memory means for simultaneously receiving and storing a data word written by the data processor to said cache memory means, said dual port memory means having a second port coupled to the system bus for providing at least one stored data word thereto for storage within the main system memory;

means coupled to the system bus for generating main system memory commands and for providing the commands over the system bus to the main system memory, a first command indicating that all bytes of a data word are to be stored within the main system memory and a second command indicating that only one or more bytes, but not all bytes, of the data word are to be stored within the main system memory; and means coupled to the system bus for detecting from the system bus an occurrence of a write access by a second system bus agent to the main system memory, the detecting means further being coupled to and responsive to said dual port memory means having at least one data word stored therein, during an occurrence of the write access by the second system bus agent, for causing an output of the generating means to generate the second command instead of the first command, wherein said dual port memory means includes storage means for storing a main system memory address associated with each stored word and further includes storage means for storing a memory command associated with each stored data word, the memory command storage means having an output coupled to the generating means for providing the memory command to the main system memory.

11. Write-through cache apparatus as set forth in claim 10 wherein said generating means is coupled to said memory command storage means output for overriding a memory command output therefrom that indicates that less than a word of data is to be stored; and for modifying the memory command output from the memory command storage means to indicate that all bytes of a word of data are to be stored.

12. Write-through cache apparatus as set forth in claim 11 wherein said address storage means has an output coupled to the system bus for providing a stored address thereto in conjunction with a data word and an associated memory command that is provided to the system bus.

* * * * *